United States Patent [19]
Hollaway
[11] 3,735,106
[45] May 22, 1973

[54] PROGRAMMABLE CODE SELECTION FOR AUTOMATIC ADDRESS ANSWERBACK IN A TERMINAL SYSTEM

[75] Inventor: John Thomas Hollaway, Austin, Tex.
[73] Assignee: International Business Machines Corporation, Armonk, N.Y.

[22] Filed: Dec. 30, 1971
[21] Appl. No.: 214,266

[52] U.S. Cl. ........235/154, 340/347 DD, 340/147 PC
[51] Int. Cl. ............................H03r 13/00, G06f 5/02
[58] Field of Search.........................340/313, 147 PC, 340/347 DD, 163; 235/154; 178/4.1 B

[56] References Cited

UNITED STATES PATENTS

| | | | |
|---|---|---|---|
| 3,506,815 | 4/1970 | Stone | 340/347 DD |
| 3,449,555 | 6/1969 | An Wang | 340/347 DD |
| 3,453,597 | 7/1969 | Pomerene | 340/163 |

*Primary Examiner*—Thomas A. Robinson
*Attorney*—John L. Jackson, Charles E. McTiernan and John F. Jancin

[57] ABSTRACT

An automatic terminal identifying system is provided which allows a terminal to respond with decimal weighted identity codes upon receipt of an identification query from a processor. To develop the identity characters the total decimal equivalent sum for each bit position of the unique identifying binary codes assigned to a terminal is determined with a binary 1 in bit 1 of character 1 given a decimal value of 1; a binary 1 in bit 1 of character 2 given a decimal value of 2; a binary 1 in bit 1 of character 3 given a decimal value of 4, etc. For three characters logical signals are generated from two clocks which are applied by means of jumpers to the output buss of the terminal such that the logical signal representative of the required decimal sum is applied to each of the bit positions on the output buss as characters are transmitted sequentially to the processor. This is accomplished by overlapping the two clocks to define three character times. A value of decimal one is applied to the output buss of the terminal during character one time; decimal two applied during character two time; and decimal four applied during character three time. Appropriate logical combinations of these clocks thus allows any decimal numbers zero through seven to be applied by means of the jumpers to the output buss of the terminal.

8 Claims, 6 Drawing Figures

| CHARACTER | BIT | | | | | | WEIGHTING FACTOR |
|---|---|---|---|---|---|---|---|
| | 1 | 2 | 3 | 4 | 5 | 6 | |
| C | 0 | 1 | 0 | 1 | 1 | 1 | $2^0$ |
| D | 0 | 1 | 0 | 1 | 0 | 1 | $2^1$ |
| E | 0 | 1 | 0 | 1 | 0 | 0 | $2^2$ |
| DECIMAL E. Q. SUM | 0 | 7 | 0 | 7 | 1 | 3 | |
FIG. 3
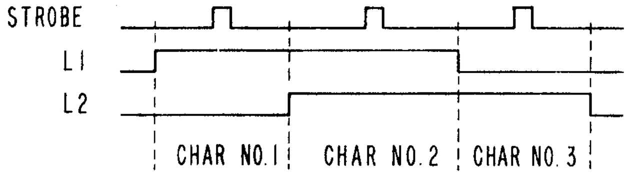
FIG. 4
| DEC. EQ./CHAR NO. | 3 | 2 | 1 | LOGIC |
|---|---|---|---|---|
| 0 OR ⏚ | 0 | 0 | 0 | $\overline{L1} \cdot \overline{L2}$ |
| 1 | 0 | 0 | 1 | $\overline{L2}$ |
| 2 | 0 | 1 | 0 | $L1 \cdot L2$ |
| 3 | 0 | 1 | 1 | L1 |
| 4 | 1 | 0 | 0 | $\overline{L1}$ |
| 5 | 1 | 0 | 1 | $\overline{L1} + \overline{L2}$ |
| 6 | 1 | 1 | 0 | L2 |
| 7 OR +V | 1 | 1 | 1 | L1 + L2 |
FIG. 5
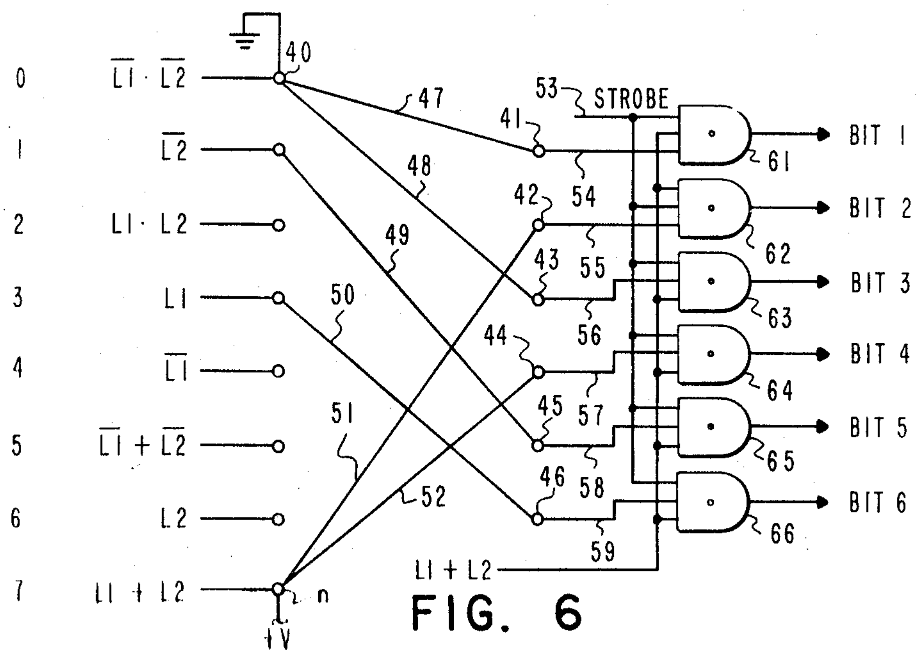
FIG. 6

PROGRAMMABLE CODE SELECTION FOR AUTOMATIC ADDRESS ANSWERBACK IN A TERMINAL SYSTEM

BACKGROUND OF THE INVENTION

1. Field of the Invention

This invention relates to terminal oriented processing systems in which, for security and programming purposes, each of the terminals is assigned identifying codes which must be transmitted, upon command to a central processing unit.

2. Description of the Prior Art

For security and programming purposes communication terminals require that a number of characters, with a programmable code selection, be encoded for transmission upon command from a central processing unit. One example of the above is the automatic address answerback feature now available on the IBM 2741 and other compatible terminals. In this type of system the plant or customer engineer must be able to "wire in" each of the characters to be encoded, as selected by the customer or dictated by the terminal architecture. The existing method used to wire in these characters can require one program jumper for each bit in each character in addition to three AND gates and 1 OR gate for each bit position of the characters. Thus for 3–6 bit characters, 18 jumpers, 18 AND gates and six OR gates are required. Not only is this method relatively costly but in addition requires an undue amount of hardware space. Further, errors can be introduced either during the original jumpering or due to the jumpers becoming loose in the field. Finally, from the standpoint of security this type of jumpering is not desirable since the identifying characters assigned to each of the terminals can be readily ascertained by viewing the jumpers.

SUMMARY OF THE INVENTION

An automatic terminal identifying system is provided which allows a terminal to respond with decimal weighted identity codes upon receipt of an identification query from a processor. To develop the identity characters the total decimal equivalent sum for each bit position of the unique identifying binary codes assigned to a terminal is determined with a binary 1 in bit 1 of character 1 given a decimal value of 1; a binary 1 in bit 1 of character 2 given a decimal value of 2; a binary 1 in bit 1 of character 3 given a decimal value of 4, etc. For three characters logical signals are generated from two clocks which are applied by means of jumpers to the output buss of the terminal such that the logical signal representative of the required decimal sum is applied to each of the bit positions on the output buss as characters are transmitted sequentially to the processor. This is accomplished by overlapping the two clocks to define three character times. A value of decimal one is applied to the output buss of the terminal during character one time; decimal two applied during character two time; and decimal four applied during character three time. Appropriate logical combinations of these clocks thus allows any decimal numbers zero through seven to be applied by means of the jumpers to the output buss of the terminal. The querying processor then accumulates the decimal values received from each bit position and decodes this sum to determine the identity of the terminal.

For instance, if a decimal one is transmitted at a particular bit position a binary 1 would have been in that bit position in the first character. A decimal three would indicate binary 1's in the corresponding bit positions in the first two characters, while a decimal seven would indicate binary 1's in the corresponding bit positions in all three characters.

BRIEF DESCRIPTION OF THE DRAWINGS

FIG. 3 is a table illustrating the correspondence code for the characters C, D, E along with the method employed for weighting each of the characters to provide a decimal equivalent total for each bit position;

FIG. 4 illustrates the two clocks employed and the character times;

FIG. 5 is a table illustrating the logical combination of the clocks of FIG. 4 which can be taken to provide the decimal numbers zero through seven; and FIG. 6 is a view illustrating the application of the logical signals to terminal pins and the jumpering to the output buss of the terminal to allow transmission of the identifying characters, C, D, and E in accordance with the present invention.

DESCRIPTION OF THE PREFERRED EMBODIMENT

Figure 1:
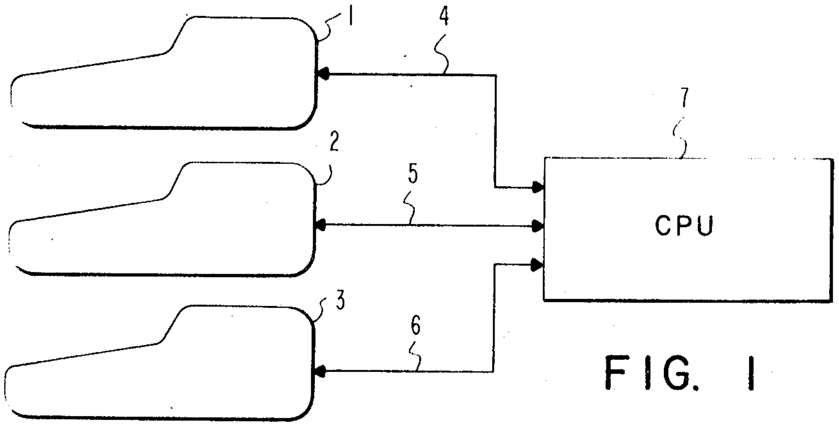
FIG. 1 is a broad block diagram illustrating a number of terminals connected to a central processing unit which normally is remotely located from the terminals.

For a more detailed description refer first to FIG. 1. As shown in FIG. 1, the invention relates generally to a terminal oriented system in which a number of terminals 1, 2, and 3 are connected for two-way communication along lines 4, 5, and 6, respectively with the central processing unit 7. For reasons of security as well as assuring that each of the terminals gets into the right or correct portion of memory and/or obtains its appropriate program, each of the terminals has an identifying code assigned to it. This code as above discussed is automatically transmitted to the central processing unit 7 whenever a terminal receives a command from the CPU.

Figure 2:
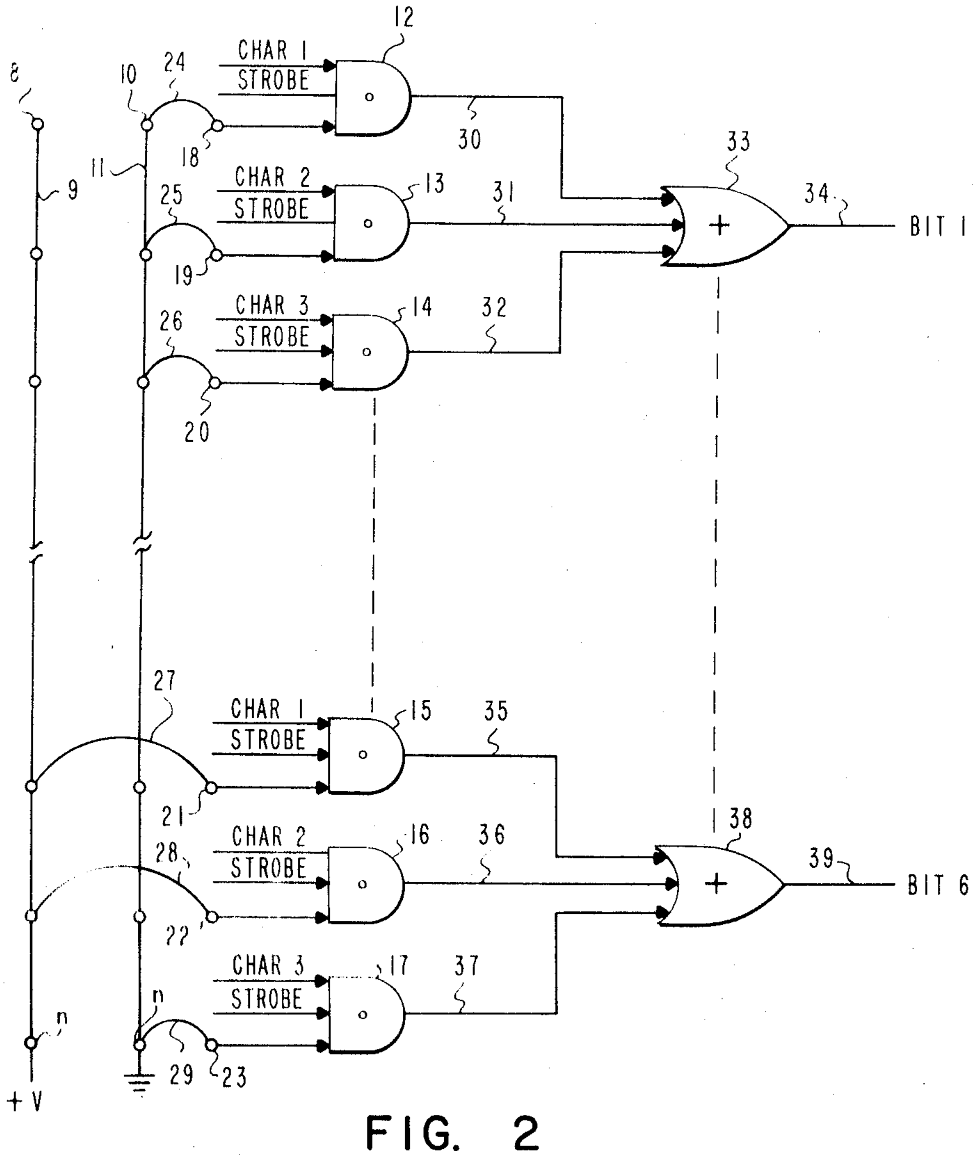
FIG. 2 is a drawing illustrating the most commonly used technique of providing automatic address answerback for terminal identification and programming purposes in a terminal oriented system.

Refer next to FIG. 2 for a description of the technique currently employed in IBM 2741 compatible terminals to provide automatic address answerback by a terminal upon query from a central processing unit. For purposes of the present description assume that each of the terminals has been assigned a three character identifier which is 6 bits in length and which is transmitted sequentially to the central processing unit upon command. As shown in FIG. 2 there are a number of pins 8 through n which for the present example, would total 18. These are each connected to a positive potential by means of line 9. A like number of pins 10 through n are connected by means of line 11 to ground. Assume further for purposes of illustration that the characters to be transmitted by a terminal are C, D and E represented in correspondence code as shown in FIG. 3. Thus for character C the binary word 010111 would be transmitted; for character D the binary word 010101 would be transmitted; and for character E the binary word 010100 would be transmitted. As shown in FIG. 2 there are three AND gates for each bit position. AND gates 12, 13, and 14 are connected along lines 30, 31 and 32 respectively to OR gate 33 which has its output along line 34. Thus, as shown through gate 33 and applied to line 34 is bit 1 of each character. There are three inputs to AND gate 12, there is a timing signal shown as character one and there is a strobe input which in the usual manner strobes the AND gate. The third input is a ground input applied from pin 10 of buss 11 by means of jumper 24 to pin 18 which in conventional notation represents a 0 which is the required binary number for bit one of the first character C. Again there are three inputs to AND gate 13, the first being a character two time; the second a strobe pulse, and the third a ground input applied by means of jumper 25 to pin 19 which as shown is input to AND gate 13. Again this results at character two time in a binary 0 being transmitted through OR gate 33 to the output line 34. Finally the three inputs to AND gate 14 are the character three time, the strobe pulse and ground applied by means of jumper 26 to pin 20 which is connected and applied as an input to AND gate 14. This again will result in a 0 being output from OR gate 33 at character three time. This sequence is repeated for bits 2 through 6 with the particular configuration for bit 6 only being shown. As shown in the table of FIG. 3 the particular bit configuration required for bit 6 is 110. AND gate 15 therefore has a positive potential applied by means of jumper 27 to pin 21 and at character one time this positive potential is strobed through AND gate 15 along line 35 through OR gate 38 and appears on the output line 39 of bit 6. The second character or character D has a positive potential applied by means of jumper 28 to pin 22 which results in a 1 being strobed out at character two time through AND gate 16 along line 36 to OR gate 38 to output line 39. Finally at character three time a ground potential is applied by means of jumper 29 to pin 23 which is gated through AND gate 17 along line 37 through OR gate 38 and applied to output line 39. From the above it can be seen that for the 3–6 bit characters a total of 18 jumpers, 18 AND gates and six OR gates are required for each of the terminals. Further by examining the jumpering the particular code assigned to the terminal can be determined.

For a better understanding of the present invention, refer next to FIG. 3 which is a table showing the binary equivalent and correspondence code of the characters C, D, and E along with the column total for each bit position of the characters. Thus as shown the decimal equivalent of bits 1 of the characters C, D, and E is 0; the decimal equivalent of bits 2 of the character C, D, and E is 7. This 7 is obtained by assigning the binary 1 in character C a decimal equivalent of 1 ($2^0$); the binary 1 in bit 2 of character D the decimal equivalent of 2 ($2^1$) and the binary 1 in bit 2 of character E the decimal equivalent of 4 ($2^2$). While only three characters are provided this sequence will follow through with additional characters as will hereinafter become obvious. The decimal equivalent of bits 3, 4, 5 and 6 are obtained in like manner.

Refer next to FIG. 4 which shows two clocks which are utilized to provide logical signals equivalent to the decimal sums required for three characters. Two clocks are required but as will be obvious to those skilled in the art, for additional characters, additional clocks in accordance with the invention would be required. In FIG. 4 the two clocks are labeled L1 and L2 and overlap as shown to provide character one time, character two time and character three time. It is logical combinations of these clocks which are gated to the CPU and decoded by the CPU to identify the codes assigned to a terminal. The strobe signal is shown in approximate relation to the switching of clocks L1 and L2. In FIG. 5 there is shown a table which illustrates how these clocks are combined to provide decimal numbers zero through seven. As shown, L1 is true for characters 1 and 2, L2 is true for characters 2 and 3. Thus it is obvious that application of logical combinations in accordance with the table of FIG. 5 will result in the transmission of the required characters to the central processing unit. This is illustrated in FIG. 6. As shown in FIG. 6 there are seven pins which have the logical combinations set forth in FIG. 5.

There is shown in FIG. 6 the jumpering required through use of applicant's novel invention to accomplish the transmission of the characters C, D, and E. In contrast to the required eighteen AND gates, six OR gates and 18 jumpers required in the prior art technique of FIG. 2, only six AND gates, 61–66 are required. In addition as shown only seven jumper terminals 40 - n are required and only 6 jumpers i.e., 1 for each bit, are required. The jumpers 47 – 52 are connected to pins 41 – 46 in a configuration in accordance with the decimal totals developed previously in connection with the discussion of the table of FIG. 3. Thus as shown at the left hand side of FIG. 6 the logical signals $\overline{L1}$ and $\overline{L2}$ result in a 0 being applied to pin 40 (alternately, pin 40 could be grounded) and this signal is applied by means of jumpers 47 and 48 to pins 41 and 43. As further shown pin 41 is connected along line 54 to AND gate 61 which in turn has a strobe pulse applied along line 53 to produce a bit 1 output. Likewise jumper 48 connects pins 40 and 43 which in turn is connected along line 56 to AND gate 63 which again receives a strobe pulse along line 53 to output a 0 at the bit three position. Again, referring to FIG. 3 it can be seen that bits 1 and 3 have a decimal total of 0. Going further, the $\overline{L2}$ signal which as discussed in connection with FIG. 5 results in a decimal 1 is applied by means of jumper 49 to pin 45 which in turn is connected along line 58 to AND gate 65 and this is strobed out to provide the bit 5 output. Finally, the L1 or L2 logical signal which results in a decimal 7 (alternately pin n could have $+v$ applied) is applied by means of jumper 51 to pin 42 which in turn is connected along line 55 to AND gate 62 and this is strobed out to provide the bit 2 output. Likewise the 7 or L1 or L2 output is applied by means of jumper 52 to pin 44 and thence along line 57 to AND gate 64 to provide, upon strobing, the bit 4 output. Thus it will be seen that through application of the logical signals representative of the decimal numbers zero through seven to the pins 40 - $n$ along with the selective jumpering to provide the bit decimal total required, that these values are in fact output to the 1 through 6 bit positions when a query signal is received from the processor.

In summary there has been described an automatic terminal identifying system which allows a terminal to respond with decimal weighted identity codes upon receipt of an identification query from a processor. To develop the identity characters the total decimal equivalent sum for each bit position of the unique identifying binary codes assigned to a terminal is determined with a binary 1 in bit 1 of character 1 given a decimal value of 1; a binary 1 in bit 1 of character 2 given a decimal value of 2; a binary 1 in bit 1 of character 3 given a decimal value of 4,etc. For three characters logical signals are generated from two clocks which are applied by means of jumpers to the output buss of the terminal such that the logical signal representative of the required decimal sum is applied to each of the bit positions on the output buss as characters are transmitted sequentially to the processor. This is accomplished by overlapping the two clocks to define three character times. A value of decimal one is applied to the output buss of the terminal during character one time; decimal two applied during character two time; and decimal four applied during character three time. Appropriate logical combinations of these clocks thus allows any decimal numbers zero through seven to be applied by means of the jumpers to the output buss of the terminal. ( The querying processor then accumulates each bit and decodes it to determine the identity of the terminal.)

For instance, if a decimal one is transmitted at a particular bit position a binary 1 would have been in that bit position in the first character. A decimal three would indicate binary 1's in the corresponding bit positions in the first two characters, while a decimal seven would indicate binary 1's in the corresponding bit positions in all three characters.

Thus it will be obvious from a comparison of FIGS. 2 and 6 that through use of the present invention not only is there a great savings in terms of the hardware and space required but in addition examination of the jumpering from pin to pin will not reveal the codes that have been programmed or wired into the terminal. This is unlike the situation when, in the technique of FIG. 2 a casual inspection would in fact reveal the binary words which have been wired into the terminal for purposes of identification.

While the invention has been particularly shown and described with reference to a preferred embodiment, it will be understood by those skilled in the art that various changes in form and detail may be made without departing from the spirit and scope of the invention.

What is claimed is:

1. A method of generating a weighted terminal identifier character, from a first set of terminal identifying characters having bit positions $B_1$, $B_2$, $- B_n$, on corresponding output lines of a terminal connected to a central processing unit, said method comprising the steps of:

applying a different weighting value to each of said first set of characters;

calculating a weighted total sum for each of said bit positions, $B_1$, $B_2$, $- B_n$, of said first set of characters;

generating logical signals representative of said weighted total sums of each of said bit positions $B_1$, $B_2$, $- B_n$, of said first set of characters; and applying said logical signals to said output lines of said terminal with said logical signals representing said total sum for bit position $B_1$ being applied to its corresponding output lines; said logical signals representing said total sum for $B_2$ being applied to its corresponding output line, and the logical signals representing said total sum for $B_n$ applied to its corresponding output line.

2. The method of claim 1 further wherein said first set of characters is weighted in a binary progression with each binary one in one of said characters being afforded a decimal equivalent of one, with each binary one a second of said first set of characters being afforded a decimal two; with each binary one in a third of said first set of characters being afforded a decimal equivalent of four, etc.

3. The method of claim 1 further wherein said logical signals are generated from clock signals which define a character time for each of said identifying characters such that said clock signal taken with the weighting value of each of said first set of characters results in the generation of signals representative of said weighted total sum.

4. The method of claim 2 further wherein said logical signals are generated from clock signals which define a character time for each of said identifying characters such that said clock signal taken with the weighting value of each of said first set of characters results in the generation of signals representative of said weighted total sum.

5. The method of claim 4 further wherein during a first character time a decimal value equal to $2^0$ is output to said output lines; during a second character time a decimal value equal to the $2^1$ is output to said output lines; during a third character time a decimal value equal to $2^2$ is output to said output lines and the above sequence repeated for each additional character time.

6. A data processing system comprising:

a central processing unit, at least one terminal in communication with said central processing unit;

means for transferring upon command codes assigned to said terminal to said central processing unit, said assigned codes being transmitted in decimal equivalent form to said central processing unit and decoded by said central processing unit to determine the binary equivalent of said assigned codes.

7. The data processing system of claim 6 wherein said assigned code is originally in the form of a plurality of binary characters which are converted to a decimal equivalent form.

8. The data processing system of claim 7 wherein said plurality of characters is weighted in a binary progression with each binary one in one of said binary characters being afforded a decimal value of one, with each binary one in a second of said binary characters being afforded a decimal value of two; with each binary one in a third of said binary characters being afforded a decimal value of four, etc.; and the said decimal equivalent is obtained by totaling the decimal sum for each of the bit positions of said binary characters.

* * * * *